Nov. 30, 1948.

D. K. WARNER 2,454,852

FAN BLADES IN OPENING OF ROTARY VALVE IN
TWO-CYCLE SUPERCHARGED ENGINE

Filed May 20, 1946

Inventor
Douglas K. Warner

Patented Nov. 30, 1948

2,454,852

UNITED STATES PATENT OFFICE 2,454,852

FAN BLADES IN OPENING OF ROTARY VALVE IN TWO-CYCLE SUPERCHARGED ENGINE

Douglas K. Warner, Sarasota, Fla.

Application May 20, 1946, Serial No. 670,986

8 Claims. (Cl. 123—73)

This invention relates to the combination of a rotary valve on an internal combustion engine crankshaft with fan blades having tip portions in line, axially, with inlet ports of the firing cylinders or combustion chambers of the engine.

This invention is particularly adapted to two cycle motors of relatively large bore and short stroke wherein a fan of relatively small diameter may have its blades in line with the cylinder inlet ports and more particularly adapted to a 5 cylinder radial motor wherein the fan blades may at all times be pumping air for 4 of the 5 cylinders and the valve portion of the combination be closing effectively the port opening to the passage in which gases are being forced from the space beneath one piston just filled by said fan into the combustion chamber of the adjacent cylinder.

I have made the crank shaft in two pieces with a simple assembly bolt to hold them together but it may of course be made in one piece or with any other assembly of connecting rods and the combination is also applicable to any usage where pulsations of air are required with and without valve means for preventing back flow of gases.

Figure 2:
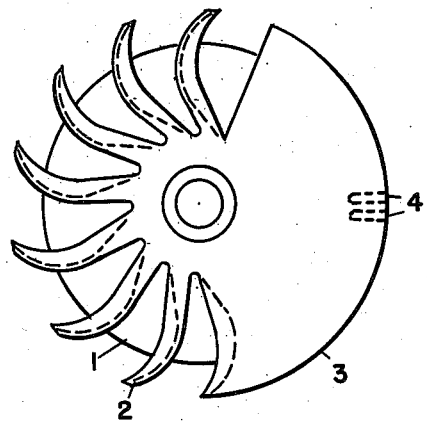
Figure 1:
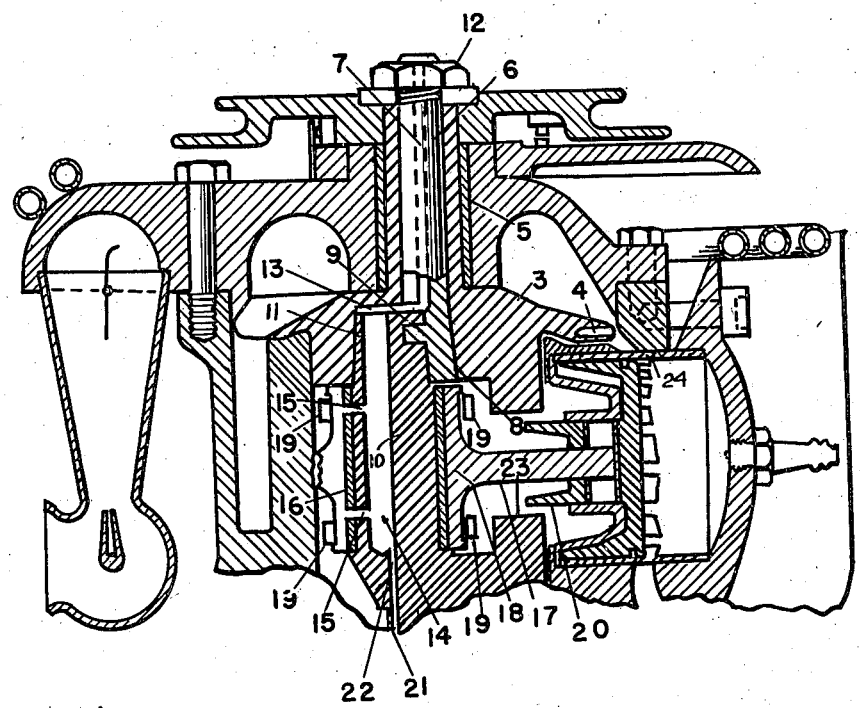

In the accompanying drawings in which like numerals indicate like parts Fig. 1 shows a cross sectional view of the crank shaft. Fig. 2 is a top view of rotary valve and half fan, in which 1 is the combination valve-fan portion of the crank shaft, 2, the fan blades, 3, the rotary valve and crank pin counterweight and 4 the balancing holes drilled in its rim, 5 the crankshaft fan main bearing portion, 6 the assembly bolt with oil supply hole 7 drilled therein, 8 the tapered end of this bolt and 9 the catch left upon it after a milling cutter has removed material into which the second portion of the crank shaft fits, said catch being used to hold said second portion firmly within the fan portion of the crank shaft.

The crank pin portion 10 has a tapered portion 11 containing a milled slot which meshes with catch 9 of assembly bolt 6. The taper of both bolt and crankpin end portion are the same but the full taper on the bolt is given only to the side opposite its milled portion in order that it may squeeze only against the crank pin when the bolt is drawn tight by nut 12. Oil delivered thru passage 7 from end of bolt runs thru recess 13 at end of crankpin hole in fan portion 1, and thence thru hole 14 in the outer portion of crank pin and thence thru holes 15 to bushing 16 which revolves at about half the crankshaft speed and thence to connecting rods 17 whose big end bearings 18 average 61 degrees cylindrical contact with bushing 16 but which by intermeshing with adjoining rods as shown in accompanying application, attain 90° contact around said bushing. Since in a 2 cycle engine the only time the rods tend to leave the crank pin is at very high speed when the explosion has maximum pressure to force rods back on the pin only the light bands 19 are required to hold rods against the bushing and these are purposely made of loose fit so that at such very high speeds the rods will leave their bushings and slightly deflect rings 19 so that the pistons may travel further into the cylinder and thereby increase the compression and explosion pressure, thereby more quickly returning the rod to its seat and increasing the thermal efficiency, while at the same time sucking a flood of oil between itself and the bushing to cushion the shock of the returning rod and by then squeezing away that oil carrying the bearing heat off in the oil and helping send more oil up into the wrist pin and the passages in the piston and to the piston walls, as described in previous applications.

Counterbalance 23 formed on the opposite end of the crank pin 10 extends inwardly over said pin as far as permitted by piston rod 20 and the main bearing portion of the crank shaft opposite the fan extends into bushing 21 which is lubricated by oil passing thru hole 22 extending straight from the inner portion of oil hole 14.

Counterbalance 23 is ground to exactly balance ½ the weight of the crankpin and its bushing and adjacent portions of connecting rods as well as ¼ the weight of the pistons and upper portions of the connecting rods.

A similar counterbalance is found on the opposite counter weight 4 plus the material in rotary valve closure portion which being remote from shaft center is able to balance the greater weight of material surrounding the crank pin extension with a lesser weight of balance metal.

Having no master rod a perfect balance is obtainable with 5 cylinders so that the fan may assist turning the engine at unusual speeds, and the fan extending out to the inlet ports may have high enough tip speed to afford means for supercharging the engine with ¼ atmosphere of superimposed pressure and for completely filling the chamber below the pistons with fresh charges of gas at that pressure by the time the piston has returned 53 degrees from top dead center and the fan passage way has been cut off by the solid portion of counterweight on the crankshaft.

The opening from the fan to the passage between cylinders starts slightly before the center line of the cylinder whose inlet ports are exposed to view and continues along a 45° of arc to about half way between said cylinder and the cylinder adjoining under whose piston the charge is thrown by the fan. The flow from the fan is in about the direction which the gas is thrown by the forwardly curved blades. When the counterweight closes the aperture the gas rushes back from under the piston and thru the inlet ports which at just that time start to open. It takes about 45 degrees of crank motion to fully open or close a fan port so that by starting to close at 8° past top center the valve is fully closed at 53° of down stroke and the charge has begun to compress in the upper portion of the space beneath the piston and the pressure wave has started to form and move toward the inlet ports of the adjacent cylinder which in ten more degrees will be sufficiently open to start passing considerable masses of charge, and by that time the piston pushing that charge will be approaching its maximum velocity and the gas will move with little resistance thru the relatively large inlet ports of these small cylinders. After 110° of complete closure the valve will start to open and will be open when piston moves up.

For any given piston speed and length of connecting rod the tip speed of the fan will be the same, if the fan tip extends to the inlet ports at the top of piston, but only in a short stroke engine will the capacity of the fan be low enough to warrant its use for furnishing the charge to the engine economically. In such an engine a fan of 4¼" diam. turning at 24000 R. P. M. has a tip speed of 535 ft. per second and since the blades are forwardly curved and the air therefor traveling out faster than the blades move, the air speed is more than half the speed of sound and the pressure obtainable therefor over ¼ atmosphere.

Thus though the charge is diminished 20% by piston rod and further diminished by inability to fill the space under the piston at top stroke this is more than offset by the fan pressure and by the increase of charge volume due to evaporation of fuel on the under walls of piston during its scavenging or down stroke when it contacts the slower fuel particles which belatedly hit the under surface of said piston as it descends with the intense heat of an explosion on its opposite wall. The fuel being heavier than the gas continues upwardly from the fan delivery and so touches the under piston wall, while the lighter gases reverse and move back with the vapors formed by evaporation of the fuel droplets. Thus we find more than a full charge entering the adjoining cylinder and under a pressure equaling that in the exhaust chamber where the jet is formed to aspirate cooling air over the cylinder head fins as described my pending app. 634,811.

This then is the supercharge under which the engine itself operates and where as in application 337,688 the crankshaft drives a second and larger fan for jet propulsion the supercharge of that fan will act upon both the exhaust jet as it is used for jet propulsion and upon the air entering the fan-valve, thereby further increasing the supercharge.

Having thus fully described my invention what I claim as new and desire to secure by Letters Patent is as follows:

1. In an internal combustion engine having piston closed inlet ports, the combination of a rotary gas inlet valve and fan blades in the open portion of said valve.

2. In a ported 2 cycle internal combustion engine having piston closed inlet ports the combination of a rotary gas inlet valve having solid and open peripheral portions and fan blades in the open portion of said rotary valve, the tips of said fan blades being axially in line with said inlet ports whereby the great radius of location of such said blades provide volume and pressure for inlet gas and whereby the smaller number of blades, provided only at that portion of the valve sector where and when needed, together with the shortness of the required gas passage adjacent thereto reduces the power required for scavenge in said 2 cycle engine.

3. In an internal combustion engine the combination of a rotary inlet valve and fan blades in the open portion thereof, a hollow shaft attached concentric with said fan-valve structure, an eccentric hole located oppositely thereto, a crank pin of a crank shaft extended within said hole and a bolt intermeshed with said crank-pin and passing thru said hollow shaft and a nut on the end of said bolt tightened against the end of said hollow shaft, whereby said crankpin is tightly pulled into and retained within said valve-fan combination.

4. In an internal combustion engine the combination of a rotary inlet valve and fan blades in the open portion thereof, a hollow shaft upon which said valve turns, a crank pin within said combination and a hollow bolt within said hollow shaft and intermeshed with said crank pin, a main crankshaft bearing at the opposite end of said crank pin and counter weights opposite each end of said crank pin and said closure portion of said valve-fan combination forming part of the counterweight at one end thereof.

5. In an internal combustion engine as described in claim 3 an oil hole drilled lengthwise in the outer portion of said pin, said hole communicating with the hole in said hollow bolt and communicating holes thru said crank pin surface farthest away from center line of said valve-fan, and a continuation of said crank pin hole by a hole of lesser diameter, the side of said hole adjacent the center line of said valve fan being a continuation of the inner side of the larger diameter hole.

6. In a rotary valve a disk of full diameter for approximately more than half the perimeter and of lesser than full diameter the balance of the perimeter, fan blades formed on the portion of lesser diameter having entering and leaving edges, the entering edges being of greater length and nearer the center at both inner and outer extremities than extremities of the edges of said leaving edges and undercut forwardly curved blades comprising said fan.

7. In a 2 cycle internal combustion engine with piston closed inlet ports, a disc acting as a valve closure and having an opening adjacent its periphery for about half its circumference, axial-radial type fan blades inserted in said opening, the air entering edge of said blades having at least twice the length of the leaving edge and the said leaving edge being disposed radially further from the center of said disc than the said entering edge.

8. In a 2 cycle internal combustion engine having piston closed inlet ports, a disc acting as a valve closure and an opening therein containing fan blades, tips of said blades discharging directly into said inlet ports, inlet edges of said blades of greater length than outlet tip edges and located nearer the axis of said disc and said inlet edges curved forwardly in the direction of motion of said disc, whereby gas picked up by said fan blades may be accelerated smoothly and delivered in small amount but at very high pressure relative to a given piston speed due to said tips extending out from the center of said engine as far as said inlet ports.

DOUGLAS K. WARNER.

REFERENCES CITED

The following references are of record in the file of this patent:

UNITED STATES PATENTS

| Number | Name | Date |
| --- | --- | --- |
| 963,366 | Gathmann | July 5, 1910 |
| 1,099,856 | McGary | June 9, 1914 |
| 1,221,840 | Daniel | Apr. 10, 1917 |
| 1,805,843 | Pierce | May 19, 1931 |
| 1,883,781 | Gosslau | Oct. 18, 1932 |

FOREIGN PATENTS

| Number | Country | Date |
| --- | --- | --- |
| 236,326 | Great Britain | 1925 |